Aug. 7, 1923.

J. SUTHERLAND 1,463,854

TOOL FOR CONTRACTING AND EXPANDING SPLIT RIMS

Filed April 1, 1922    4 Sheets-Sheet 1

Witnesses:-
Hyman Berman
Lawrence Schlosser

Inventor
John Sutherland,
By Clarence A. O'Brien
Attorney

Aug. 7, 1923.

J. SUTHERLAND 1,463,854

TOOL FOR CONTRACTING AND EXPANDING SPLIT RIMS

Filed April 1, 1922

Witnesses:-
Hyman Berman
Laurence Schlosser

Inventor
John Sutherland,
By Clarence A. O'Brien
Attorney

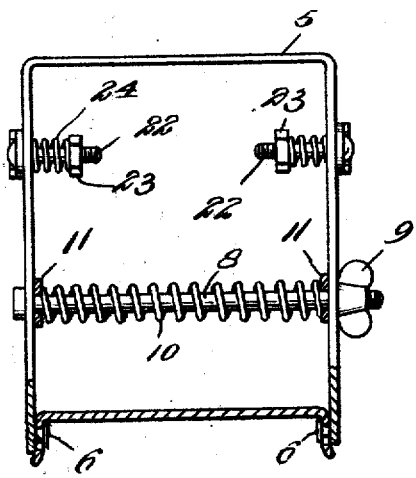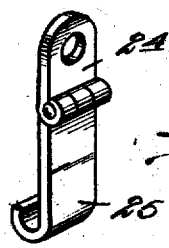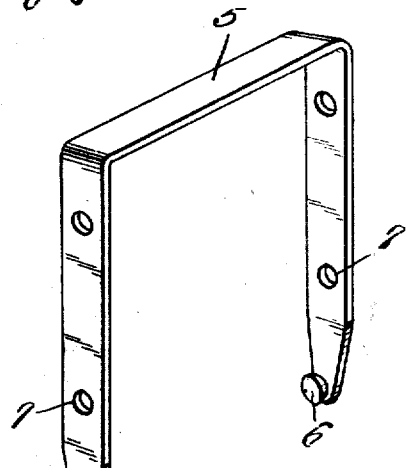

Patented Aug. 7, 1923.

1,463,854

UNITED STATES PATENT OFFICE.

JOHN SUTHERLAND, OF SPRINGER, NEW MEXICO.

TOOL FOR CONTRACTING AND EXPANDING SPLIT RIMS.

Application filed April 1, 1922. Serial No. 548,635.

*To all whom it may concern:*

Be it known that I, JOHN SUTHERLAND, a citizen of the United States, residing at Springer, in the county of Colfax and State of New Mexico, have invented new and useful Improvements in Tools for Contracting and Expanding Split Rims, of which the following is a specification.

This invention relates to improvements in tools for contracting and expanding the split rims used on motor vehicles for holding the tires on the wheels of the vehicle.

In carrying out the present invention it is my purpose to provide a tool of this character whereby the tire carrying rim may be quickly and conveniently contracted and likewise expanded, and wherein the component parts of the tool will be so arranged and co-related as to reduce the possibility of derangement to a minimum, and at the same time permit of the use of the tool with convenience and rapidity.

With the above recited object in view and others of a similar nature, the invention resides in the construction, combination and arrangement of parts set forth in and falling within the scope of the appended claim.

In the accompanying drawings:

Figure 5 is a vertical section on the line 5—5 of Figure 1.

Figure 8 is a sectional view on the line 8—8 of Figure 1.

Figure 9 is a perspective view of one of the holding jaws used with my tool.

Figure 10 is a perspective view of the operating yoke.

Figure 1:
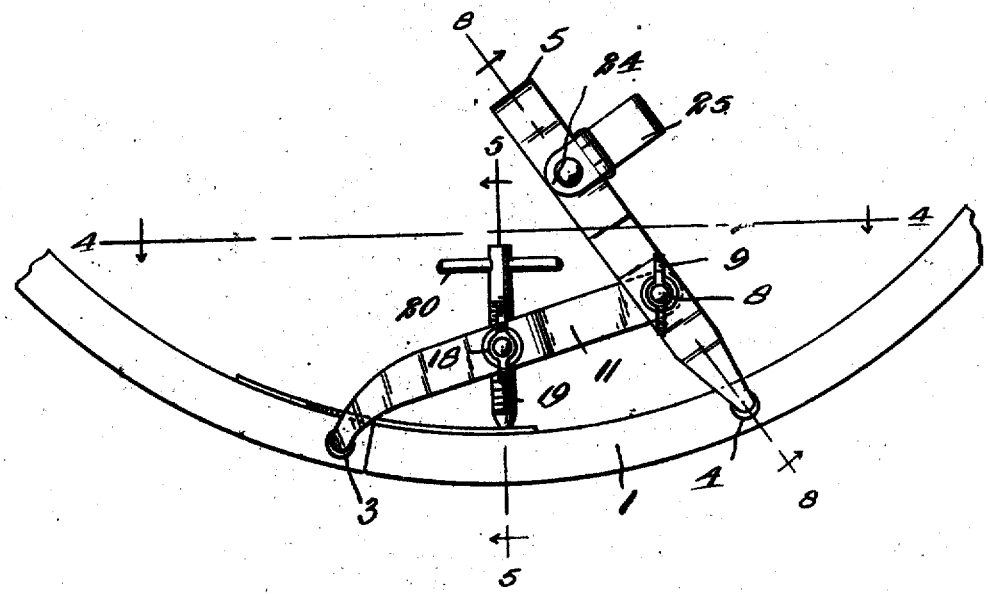
Figure 1 is a fragmentary side elevation of a tire carrying rim showing my improved tool applied thereto for contracting the rim.

Referring now to the drawings in detail 1 designates a split rim adapted to carry the tire and having the meeting ends so arranged as to be moved into and out of alinement in order to effect the expanding and contracting of the rim.

Figure 2:
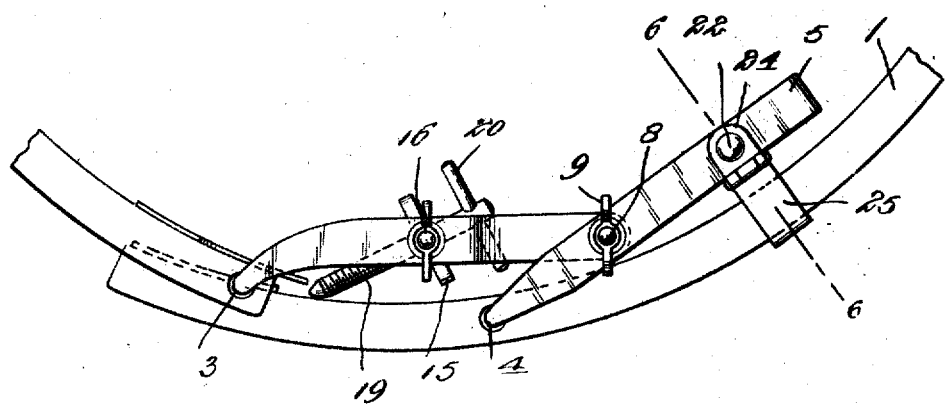
Figure 2 is a similar view showing the rim contracted by my improved tool.

The rim at one end thereof is formed with a depression 2, while the side flanges of the rim adjacent to one end thereof are formed with alining openings 3 and 4, the openings 4 being arranged a greater distance from the corresponding end of the rim than the openings 3, as clearly illustrated in Figures 1 and 2 of the drawings.

In the present instance my improved tool comprises a substantially U-shaped yoke or lever 5 having the ends inturned to provide hooks 6 adapted to engage respectively in the openings 4, the yoke 5 being of substantially the same width as the corresponding dimension of the rim. Formed in the arms of the yoke 5 are alining openings 7 arranged adjacent to the hooked ends of the arms of the yoke and extending through these alining openings 7 is a rod 8 equipped with a head at one end and threaded at its opposite end to receive a winged nut 9. Surrounding the rod 8 between the arms is a coil expansion spring 10. 11—11 designate links which, in the present instance, constitute means for connecting the yoke 5 or operating member with the end portion of the rim at the other side of the split portion.

Figure 4:
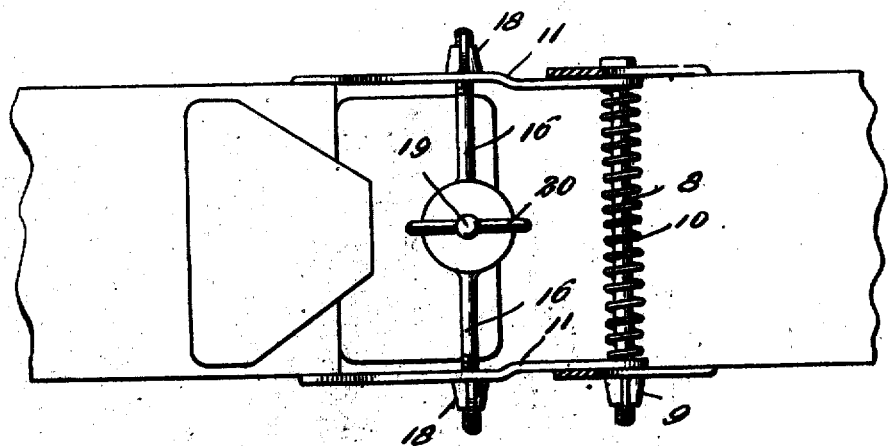
Figure 4 is a section on the line 4—4 of Figure 1.

The yoke ends of the links 11—11 are formed with openings 12 respectively through which pass the rod 8, as shown in Figures 4 and 8. These ends of the links are offset inwardly as at 13 and lie against the inner sides of the respective arms of the yoke or operating member 5, while the other ends of the links 11 are formed with inwardly turned hooks 14—14 respectively that are designed to engage in the openings 3 in the flanges of the rim, thus forming a connection between the operating member 5 and the other end of the rim, as shown in Figures 2 and 4.

The spring 10 surrounding the rod 8 bears against the apertured ends of the links 11—11 and holds the links against the respective arms of the yoke so that the links will be at all times in position to engage the proper end of the rim.

In the present embodiment of my invention I employ means for breaking the rim initially. In this instance the breaking means comprises a circular plate 15 arranged between the links 11 and formed with diametrically opposed outwardly extending arms 16 having their outer ends 17 formed in the links 16. The threaded ends of the arms 16 are provided with wing nuts 18 to hold the arms and plate 15 in proper position. Threaded through an opening in the plate 15 is a screw 19 having one end formed to engage in the depression 2 and the other end provided with a handle 20.

Figure 3:
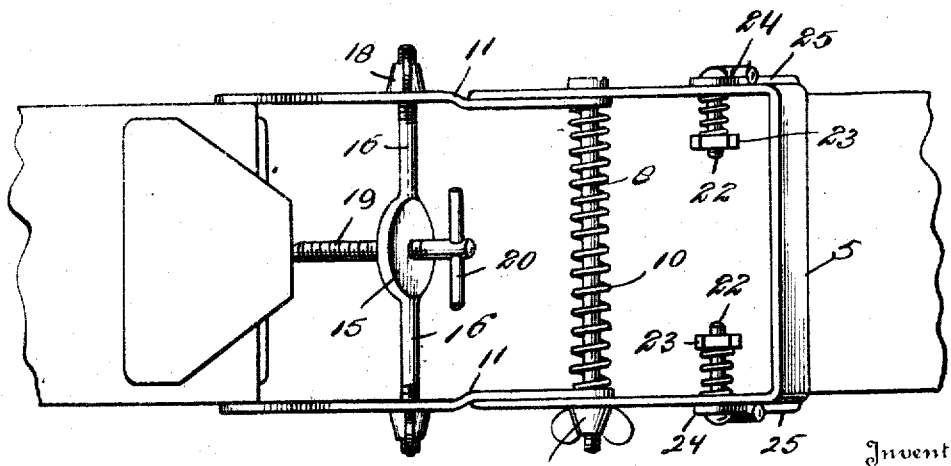
Figure 3 is a top plan view of the same.

In the operation of my tool the hooked ends 6 of the yoke 5 are engaged in the openings 4 and the hooked ends of the links 11 carried by the yoke are engaged in the openings 3 in the rim to be contracted as shown in Figure 1. The screw 19 is now operated to force one end of the rim out of alinement with the adjoining end, thereby breaking the rim so that one end may overlap and pass the other. The yoke or operating member is swung from the position shown in Figure 1 to that illustrated in Figure 2, thereby forcing the ends of the rim into an overlapping position as in Figure 2 and contracting the rim. Owing to its pivotal connection with the links 11 the plate 15 turns in the sliding of the ends of the rim, thereby permitting the screw 19 to disengage the rim as in Figures 2 and 3. The tire may now be removed from the rim.

To expand the rim after the tire has been replaced the screw 19 is operated to an inactive position and the yoke 5 swung from the position shown in Figure 2 to the position in Figure 1, thereby expanding the rim and bringing the ends into alinement and locking relation.

Figure 6:
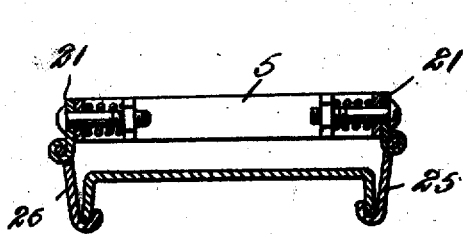
Figure 6 is a sectional view on the line 6—6 of Figure 2.
Figure 7:
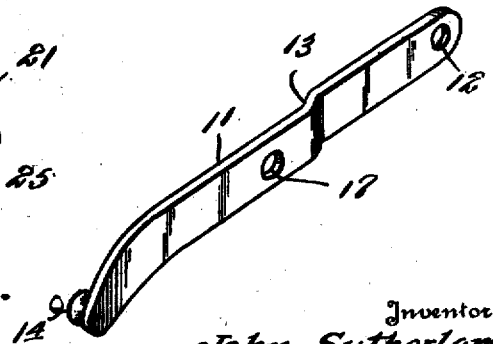
Figure 7 is a perspective view of one of the links of the tool.

If desired I may employ a retaining means for holding the operating member in rim contracting position. This retaining means in its present form embodies plates 21 connected with the arms of the yoke 5 adjacent to the cross bar of the yoke by means of bolts 22 equipped with nuts 23 and expansion springs 24 on the respective bolts between the nuts and the confronting faces of the arms, as clearly shown in Figures 6 and 8. Hinged or otherwise pivotally connected with plates are hooked elements 25 designed to engage over the flanges of the rim, as in Figure 8, in order to hold the tool in rim contracting position. The hooked elements are, of course, disengaged from the rim when the tool is operated to expand the rim. The springs 24 permit free and easy movement of the hooked elements 25 in the use of the tool.

From the foregoing description taken in connection with the accompanying drawings it will be seen that I have provided a tool which may be easily and quickly operated and wherein the component parts are so connected and associated as to give the requisite power for contracting and expanding the rim without undue exertion on the part of the operator or person using the device. Furthermore, it will be seen that my improved tool may be folded into small compass when not in use and stored away without taking up very large space, the arrangement of the parts being such as to facilitate quick folding of the tool.

Having thus described the invention, what is claimed as new, is:—

In a tire rim tool, a U-shaped lever having the free ends of its legs provided with means for pivotal and detachable connection to the side flanges of a split rim at one side of the split thereof, a pair of parallel links, each having one end pivotally connected to a leg of the lever intermediate the ends of the leg and having its other end provided with means for pivotal and detachable connection to a side flange of the rim at the other side of the split, a cross member connecting said links intermediate the ends of the latter, and a screw threaded through said cross member for initially breaking the rim, said cross member being axially rotatable relative to the links for permitting the swinging of the screw into and out of operative position.

In testimony whereof I affix my signature.

JOHN SUTHERLAND.